United States Patent
He et al.

(10) Patent No.: US 12,069,609 B2
(45) Date of Patent: Aug. 20, 2024

(54) UE GROUPING SCHEME FOR ENHANCED PAGING RECEPTION

(71) Applicant: QUALCOMM Incorporated, San Diego, CA (US)

(72) Inventors: Linhai He, San Diego, CA (US); Miguel Griot, La Jolla, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,243

(22) Filed: Feb. 28, 2022

(65) Prior Publication Data

US 2022/0322284 A1 Oct. 6, 2022

Related U.S. Application Data

(60) Provisional application No. 63/169,057, filed on Mar. 31, 2021.

(51) Int. Cl.
*H04W 68/02* (2009.01)
*H04W 4/08* (2009.01)

(52) U.S. Cl.
CPC ............. *H04W 68/02* (2013.01); *H04W 4/08* (2013.01)

(58) Field of Classification Search
USPC ........................................................ 455/458
See application file for complete search history.

(56) References Cited

U.S. PATENT DOCUMENTS 5,613,199 A * 3/1997 Yahagi .................. H04W 68/04
455/433
5,675,344 A * 10/1997 Tong .......................... G01S 5/14
455/456.5

(Continued)

FOREIGN PATENT DOCUMENTS

| CN | 105960822 A | * | 9/2016 | ............... H04W 4/70 |
| CN | 109219967 A | * | 1/2019 | ........... H04B 7/0617 |

(Continued)

OTHER PUBLICATIONS

CMCC: "Considerations on UE Paging Enhancement", 3GPP Draft, R2-2101887, 3GPP TSG-RAN WG2 Meeting #113 electronic, 3rd Generation Partnership Project (3GPP), vol. RAN WG2, No. electronic Jan. 15, 2021 (Jan. 15, 2021), XP051974749, 4 Pages, Retrieved from the Internet: URL: https://ftp.3gpp.org/tsg_ran/WG2_RL2/TSGR2_113-e/Docs/R2-2101887.zip R2-2101887 Considerations on UE paging enhancement.doc [retrieved on Jan. 15, 2021] the whole iocument.

(Continued)

*Primary Examiner* — Inder P Mehra
(74) *Attorney, Agent, or Firm* — Procopio, Cory, Hargreaves & Savitch

(57) ABSTRACT

A UE may select one or more paging attributes for paging reception. The one or more paging attributes may be selected from a set of network supported paging attributes. The UE may transmit, to a network, an indication of the one or more paging attributes for paging reception. The UE may receive, from the network, a response message based on the indication of the one or more paging attributes. The response message may include a first UE group number. The first UE group number may be based on at least the one or more paging attributes. The UE may receive a paging indication including a UE group number. The UE may proceed to receive and decode the paging message associated with the (Continued)

paging indication when the UE group number in the paging indication matches the first UE group number. Otherwise, the UE may safely disregard the paging message.

42 Claims, 12 Drawing Sheets

(56) References Cited

U.S. PATENT DOCUMENTS

| | | | | |
|---|---|---|---|---|
| 9,426,642 | B1* | 8/2016 | Sridhar | H04W 8/06 |
| 10,660,063 | B2 | 5/2020 | Park et al. | |
| 2004/0082352 | A1 | 4/2004 | Keating et al. | |
| 2004/0254980 | A1* | 12/2004 | Motegi | H04W 68/00 |
| | | | | 709/203 |
| 2007/0064662 | A1* | 3/2007 | Bultan | H04W 52/287 |
| | | | | 455/401 |
| 2010/0103901 | A1* | 4/2010 | Miki | H04L 5/0041 |
| | | | | 370/330 |
| 2011/0051668 | A1* | 3/2011 | Lee | H04W 72/23 |
| | | | | 370/328 |
| 2012/0076085 | A1 | 3/2012 | Chou | |
| 2012/0089985 | A1* | 4/2012 | Adar | G06F 11/3466 |
| | | | | 712/228 |
| 2012/0209978 | A1* | 8/2012 | Cho | H04W 60/04 |
| | | | | 709/223 |
| 2014/0213277 | A1* | 7/2014 | Jang | H04W 36/22 |
| | | | | 455/453 |
| 2018/0270895 | A1* | 9/2018 | Park | H04W 8/005 |
| 2018/0279411 | A1* | 9/2018 | Kang | H04W 76/32 |
| 2019/0116631 | A1* | 4/2019 | Talebi Fard | H04W 76/11 |
| 2020/0305046 | A1* | 9/2020 | Won | H04W 36/08 |
| 2021/0360582 | A1 | 11/2021 | Priyanto et al. | |
| 2022/0095226 | A1* | 3/2022 | Chang | H04W 52/0229 |
| 2022/0174644 | A1 | 6/2022 | Shi et al. | |
| 2023/0092687 | A1* | 3/2023 | Berggren | H04W 68/025 |

FOREIGN PATENT DOCUMENTS

| | | | | |
|---|---|---|---|---|
| CN | 109800291 | A * | 5/2019 | H04W 4/70 |
| WO | 2020091643 | A1 | 5/2020 | |
| WO | 2020206632 | A1 | 10/2020 | |
| WO | WO-2020253581 | A1 * | 12/2020 | H04W 52/0225 |
| WO | 2022081834 | A1 | 4/2022 | |

OTHER PUBLICATIONS

Intel Corporation: "Network Assigned Subgrouping", 3GPP Draft, R2-2101301, 3GPP TSG RAN WG2 Meeting #113e, 3rd Generation Partnership Project (3GPP), Mobile Competence Centre, 650, Route Des Lucioles, F-06921, Sophia-Antipolis Cedex, France, vol. RAN WG2, No. E-Meeting, Jan. 25, 2021-Feb. 5, 2021, Jan. 15, 2021 (Jan. 15, 2021), XP051974247, 3 Pages, Retrieved from the Internet: URL: https://ftp.3gpp.org/tsg_ran/WG2_RL2/TSGR2_113-e/Docs/R2-2101301.zip R2-2101301-PWS-V1.docx [retrieved on Jan. 15, 2021] the whole document.
International Search Report and Written Opinion—PCT/US2022/022688—ISA/EPO—dated Jun. 22, 2022.
Mediatek Inc: "Report of [AT114-e][025][ePowSav] Subgrouping Network Architecture", R2-210xx, 3GPP TSG-RAN WG2 Meeting #114 electronic, Online, May 19-May 27, 2021, pp. 1-18.
Intel Corporation: "[POST112-e][064][Pow17] Group Determination", 3GPP TSG-RAN WG2 #113 electronic, R2-2100389, Electronic Meeting, Jan. 25-Feb. 5, 2021, 44 pages.

* cited by examiner

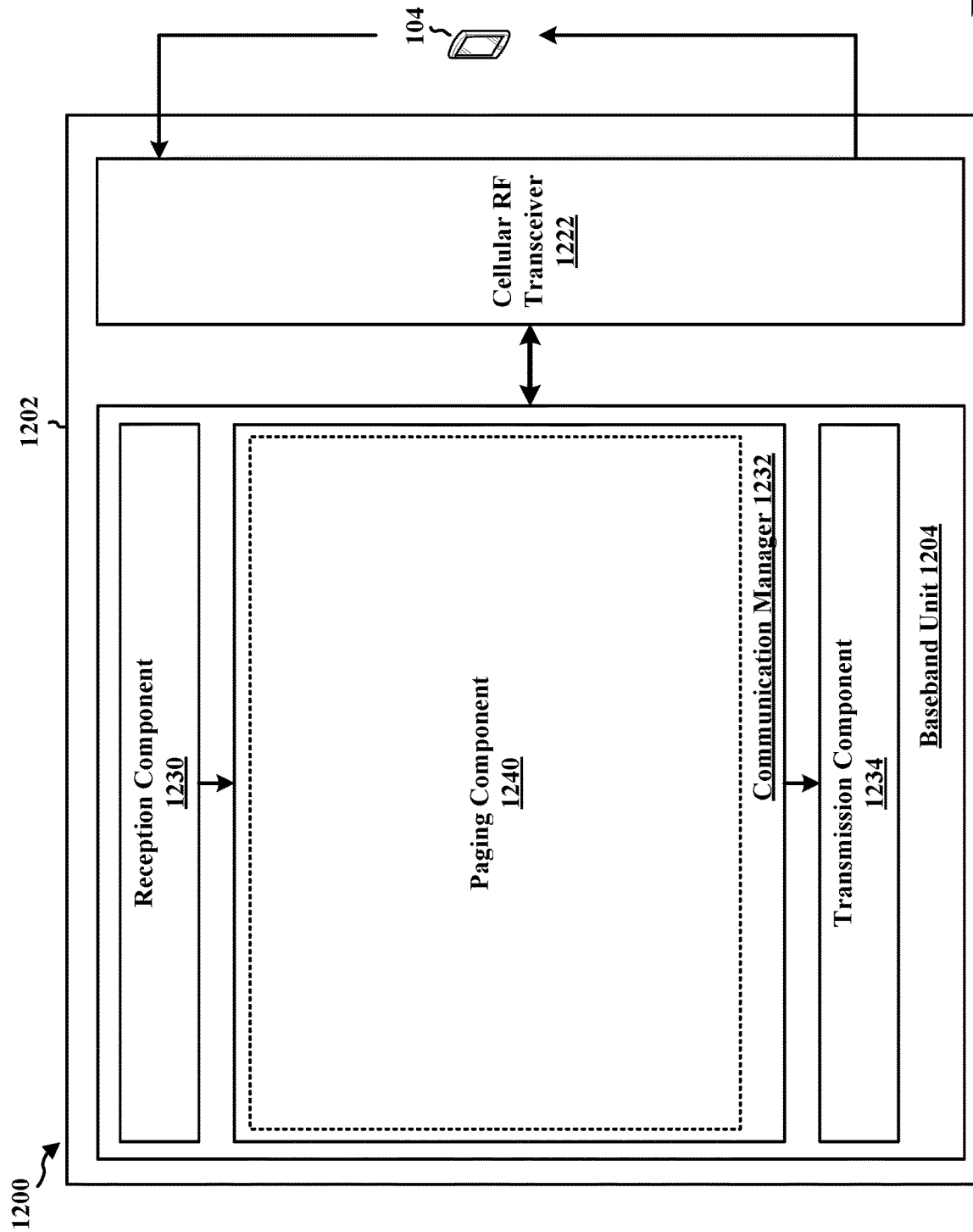

UE GROUPING SCHEME FOR ENHANCED PAGING RECEPTION

CROSS REFERENCE TO RELATED APPLICATION(S)

This application claims the benefit of and priority to U.S. Provisional Application Ser. No. 63/169,057, entitled "UE Grouping Scheme for Enhanced Paging Reception" and filed on Mar. 31, 2021, which is expressly incorporated by reference herein in its entirety.

TECHNICAL FIELD

The present disclosure relates generally to communication systems, and more particularly, to user equipment (UE) grouping for paging reception.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may select one or more paging attributes for paging reception. The one or more paging attributes may be selected from a set of network supported paging attributes. The apparatus may transmit, to a network, an indication of the one or more paging attributes for paging reception. The apparatus may receive, from the network, a response message based on the indication of the one or more paging attributes. The response message may include a first UE group number.

In an aspect of the disclosure, a method, a computer-readable medium, and an apparatus are provided. The apparatus may be a network. The apparatus may receive, from at least one UE, an indication of one or more paging attributes for paging reception. The apparatus may identify, based on at least the indication of the one or more paging attributes, a first UE group number for paging reception. The apparatus may transmit, to the at least one UE, a response message based on the identified first UE group number. The response message may include the first UE group number.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a diagram illustrating an example of a hardware implementation for an example apparatus.

DETAILED DESCRIPTION

Figure 1:
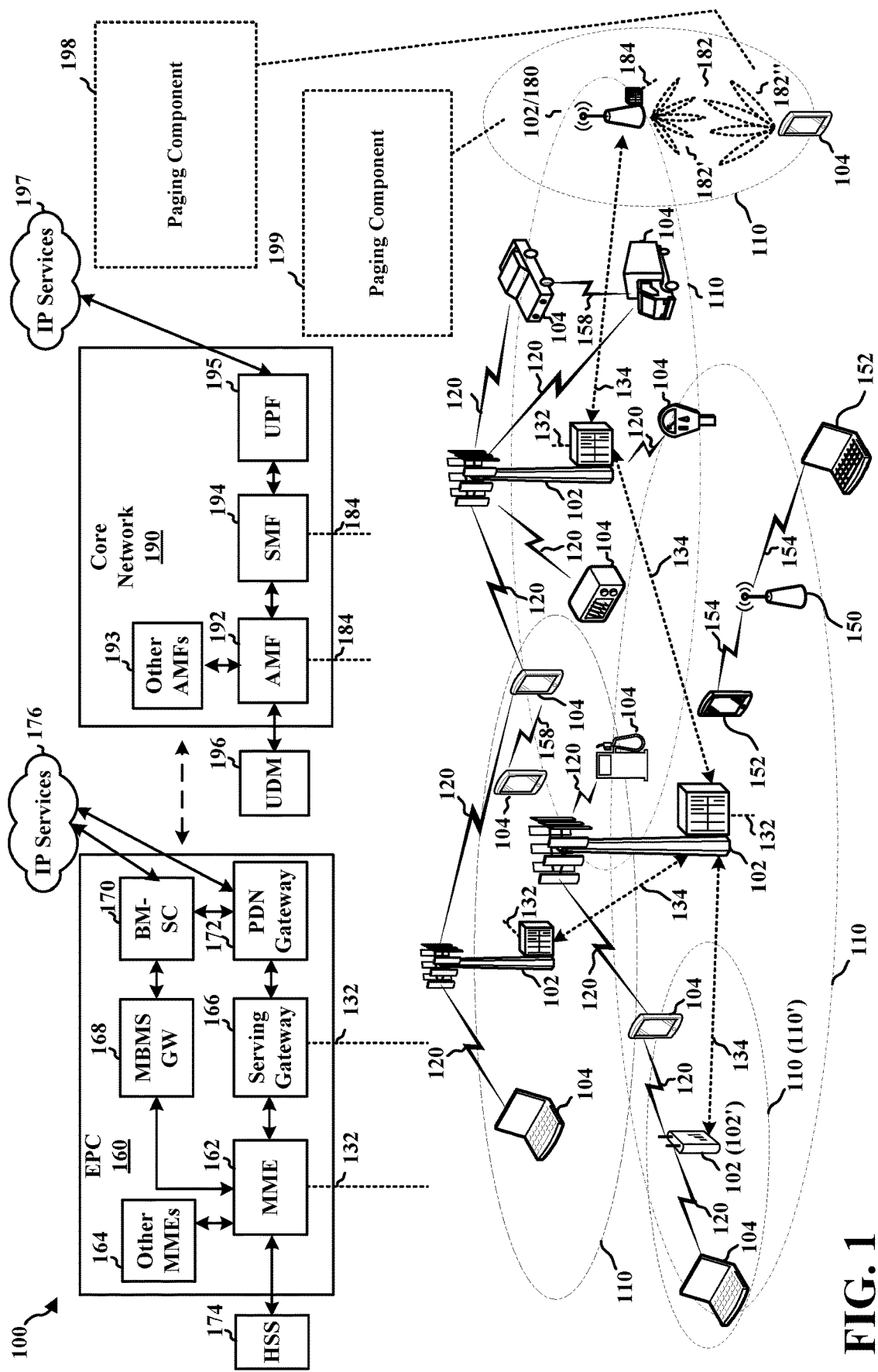
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a paging component 198 that may be configured to select one or more paging attributes for paging reception. The one or more paging attributes may be selected from a set of network supported paging attributes. The paging component 198 may be configured to transmit, to a network, an indication of the one or more paging attributes for paging reception. The paging component 198 may be configured to receive, from the network, a response message based on the indication of the one or more paging attributes. The response message may include a first UE group number. In certain aspects, the base station 180 may include a paging component 199 that may be configured to receive, from at least one UE, an indication of one or more paging attributes for paging reception. The paging component 199 may be configured to identify, based on at least the indication of the one or more paging attributes, a first UE group number for paging reception. The paging component 199 may be configured to transmit, to the at least one UE, a response message based on the identified first UE group number. The response message may include the first UE group number. Although the following description may be focused on 5G NR, the concepts described herein may be applicable to other similar areas, such as LTE, LTE-A, CDMA, GSM, and other wireless technologies.

Figure 2:
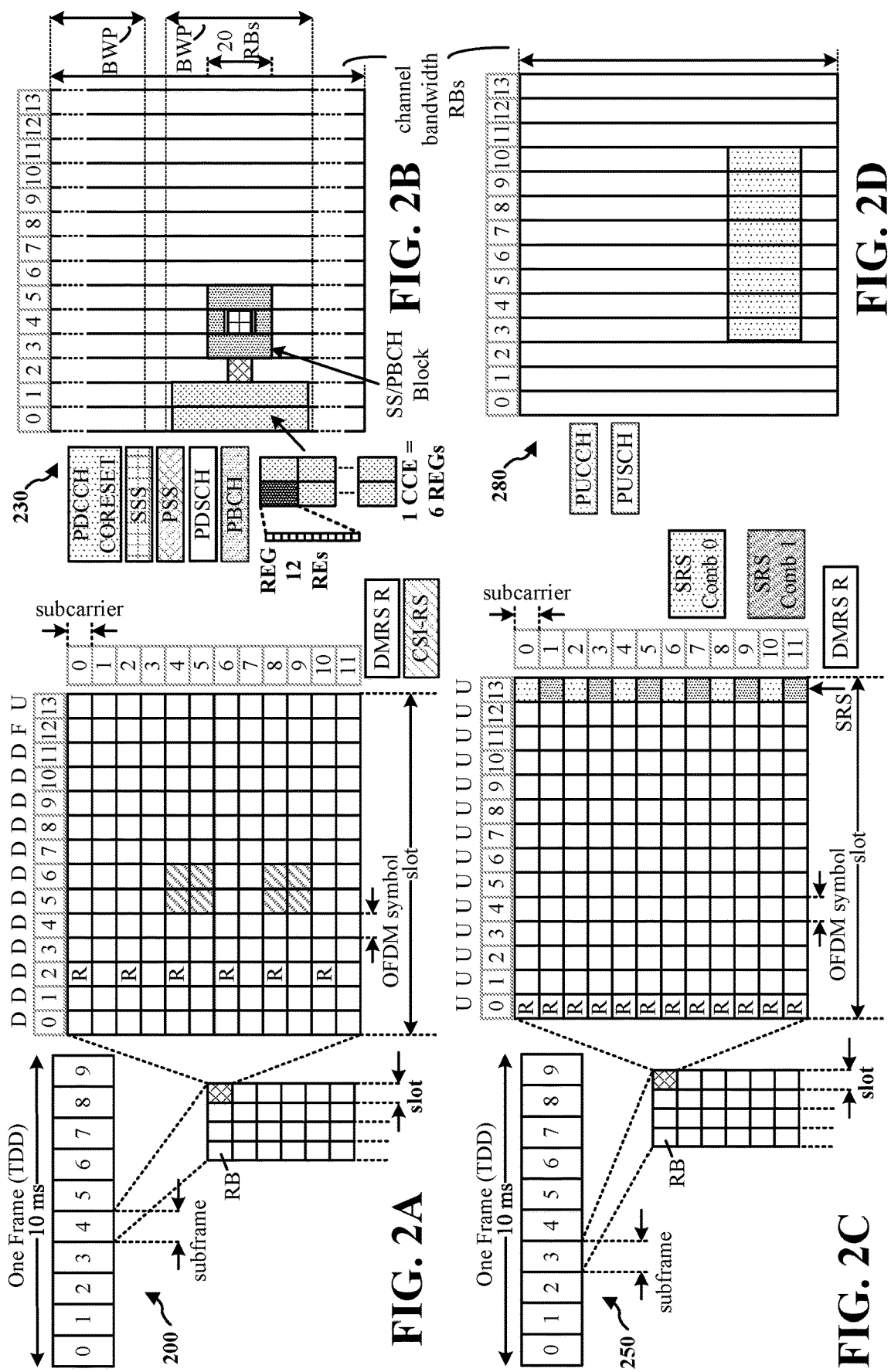
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA)

symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^{\mu}*$ 15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
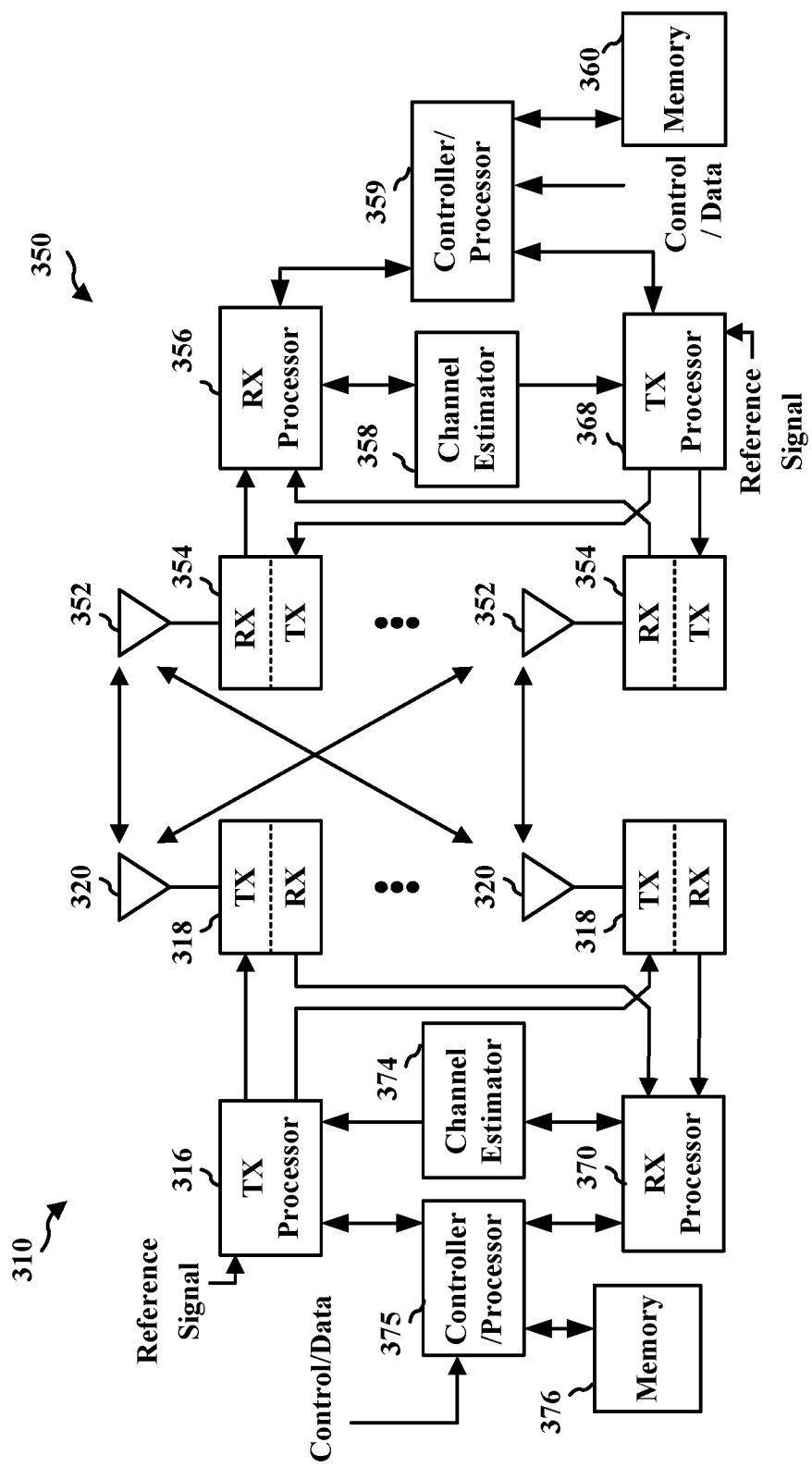
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160.

The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

It may be advantageous to improve the paging process to reduce unnecessary UE paging receptions. One of the techniques to reduce false (e.g., unnecessary) paging reception may be to separate UEs within a paging occasion (PO) into multiple groups. Absent grouping, all UEs within the PO may wake up during the PO to receive and decode the paging message even if the page is for a single UE. These groups may be referred herein as UE groups. Thus, with UE grouping, when the network transmits a paging indication to UEs in a PO, the network may indicate the group of UEs for which the page is intended, so that UEs in the PO but not being paged may not waste power in receiving and decoding the paging message.

UEs in a PO may be grouped in various different ways. To reduce power consumption associated with a page reception, the UE attributes that may have an impact on power may be considered in the grouping of the UEs. Examples of the UE attributes that may have an impact on power may include the UE's paging probability (i.e., how likely the UE is to get a page), the UE's power state (e.g., plugged in vs. battery powered), among others. Because different types of UEs may exist in a cell, it may be challenging to find a single UE attribute for grouping the UEs that works well for all possible scenarios. The UE attributes that are utilized for UE grouping may be referred to as UE paging attributes, or simply paging attributes. According to aspects, UEs may provide their UE paging attributes to the network, and the network may decide how to group the UEs based on the UE paging attributes provided by the UEs.

In one aspect, the network may advertise a set of attributes that the network may use to group the UEs in a PO. The set of attributes may include one or more of the UE's paging probability (e.g., the probability or likelihood that the UE may get a page), the UE's power profile (e.g., a battery powered UE may be sensitive to power vs. a UE that is plugged in may be insensitive to power), the UE's RRC state (e.g., RRC Inactive or RRC Idle), or the UE's mobility (e.g., stationary or mobile). The network may use additional information the network may have about a UE (e.g., the UE's capabilities, such as the number of antennas, as UEs with fewer antennas may be associated with more repetitions), or information received from other network entities (e.g., the expected UE behavior information from the Application Function "AF"), in the UE grouping decision.

In one aspect, a UE may provide its information (e.g., an indication) about a selected set of the advertised UE paging attributes to the network. In one configuration, the UE may provide the indication of the UE paging attributes to the core network (in a particular example, to the AMF) by NAS signaling. In one configuration, the UE may provide the indication of the UE paging attributes to the RAN (in a particular example, to the base station) in a UE Assistance Information (UAI) message.

In one aspect, when or whether, if at all, to provide the UE paging attributes or which attributes to provide may be based on the UE implementation. In one configuration, the UE may provide its UE paging attributes to the network when the UE is in the RRC Connected state. For example, the UE may provide its UE paging attributes to the network when the UE enters the RRC Connected state due to a data transfer, a registration, or a tracking area update, etc. In one configuration, the UE may initiate an RRC connection to update the UE paging attributes. This may be useful when the UE paging attributes have changed significantly (e.g., when the power source of the UE has changed from plugged-in power to battery power, or the expected paging rate has increased, etc.). This may also be useful when a set of UE paging attributes advertised by the network have changed. In one configuration, the network may configure a prohibit timer to control how often the UE may report or update the UE paging attributes. The timer may start or reset when the UE submits a UE paging attributes report to the network. The UE may be prevented or prohibited from submitting another UE paging attributes report as long as the timer is still running (i.e., before the expiration of the timer), such that excessive UE paging attributes reporting may be avoided.

Figure 4:
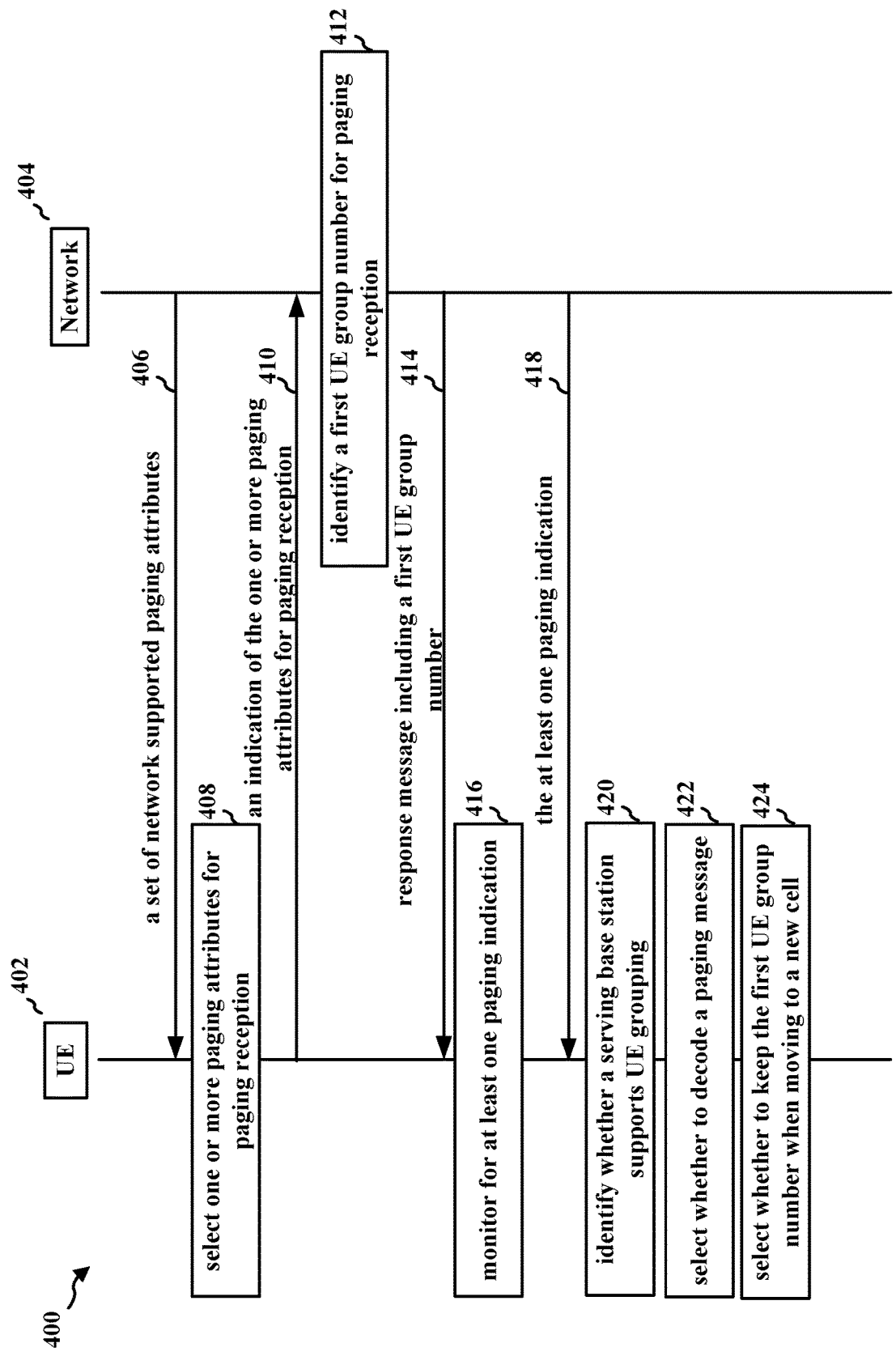
FIG. 4 is a communication flow of a wireless communication system.

FIG. 4 is a communication flow 400 of a wireless communication system. At 406, the UE 402 may receive, from the network 404, a set of network supported paging attributes for paging reception prior to selecting at 408 the one or more paging attributes for paging reception. In other words, the network 404 may transmit, to the UE 402, a set of network supported paging attributes for paging reception prior to receiving at 410, from the UE 402, the indication of the one or more paging attributes for paging reception. The set of network supported paging attributes may be transmitted, e.g., in system information (e.g., in a MIB or SIB), or via NAS signaling. In another configuration, the set of network supported paging attributes associated with the network 404 may be preconfigured or predefined at the UE 402.

At 408, the UE 402 may select one or more paging attributes for paging reception. The one or more paging attributes may be selected from a set of network supported paging attributes. At 410, the UE 402 may transmit, to a network 404, and the network 404 may receive, from at least one UE 402, an indication of the one or more paging attributes for paging reception. The one or more paging attributes may include at least one of a UE paging probability, a UE power profile, a UE RRC state, or a UE mobility, etc. The UE 402 may transmit the indication of the one or more paging attributes for paging reception to an AMF of the network 404 via NAS signaling, or to a RAN (e.g., a serving base station of the UE 402) of the network 404. The UE 402 may transmit the indication of the one or more paging attributes to the network 404 when the UE 402 is in an RRC Connected state. In one aspect, the UE 402 may initiate an RRC connection to transmit the indication of the one or more paging attributes to the network 404. In one aspect, the UE 402 may not transmit a subsequent indication of the one or more paging attributes before an expiration of a timer started, set, or reset at a previous transmission of the indication of the one or more paging attributes.

At 412, the network 404 may identify, based at least on the indication of the one or more paging attributes, a first UE group number for paging reception. The first UE group number may include an index for UEs targeted with a paging indication including the first UE group number. In one aspect, the network 404 may identify the first UE group number based further on information from another network entity (e.g., the AF). The information from another network entity may include at least one of an expected UE behavior, an expected UE mobility, or an expected UE paging probability, etc.

At 414, the network 404 may transmit, to the at least one UE 402, and the UE 402 may receive, from the network 404, a response message based on the identified first UE group number. The response message may include the identified first UE group number. In one aspect, the one or more paging attributes may include a UE RRC state. The first UE group number may be for an RRC Idle state. The response message received from the network 404 may further include a second UE group number for an RRC Inactive state. Assignment of a PO to the UE 402 may be based on the one or more paging attributes. In one aspect, the first UE group number may be identified at the AMF of the network 404. The AMF may transmit the first UE group number to a serving base station of the UE 402 in the network 404. In another aspect, the first UE group number may be identified at the serving base station of the UE 402 in the network 404. The serving base station may transmit the first ULE group number to an AMF of the network 404.

At 416, the UE 402 may monitor, based on the first UE group number, for at least one paging indication. At 418, the network 404 may transmit, to the at least one UE 402, and the UE 402 may receive, from the network 404, based on the first UE group number, at least one paging indication. The paging indication may be a paging DCI message. In one configuration where a legacy paging DCI message is used for paging indication, the network 404 may transmit the paging indication (e.g., a paging DCI message) in the PO assigned to the UE 402. In another configuration where the paging early indication (PEI) is used for paging indication, the network 404 may transmit the paging indication (e.g., a paging DCI message) in a slot prior to the PO assigned to the UE 402. The network 404 may further transmit a paging message associated with the at least one paging indication.

When the UE 402 is in an RRC Idle state, to transmit the at least one paging indication, the AMF of the network 404 may transmit a paging notification to a serving base station of the UE 402 in the network 404, and the serving base station of the UE 402 in the network 404 may transmit the at least one paging indication to the UE 402.

When the UE 402 is in an RRC Inactive state, to transmit the at least one paging indication, an anchor base station of the network may transmit a RAN paging message to a paging base station of the network 404, and the paging base station of the network 404 may transmit the at least one paging indication to the UE 402.

At 420, the UE 402 may identify, based on the at least one paging indication, whether a serving base station of the UE 402 in the network 404 supports UE grouping. That the UE group number is missing in the paging indication may indicate that the serving base station does not support UE grouping.

At 422, the UE 402 may select, based on the first UE group number and the at least one paging indication, whether to decode a paging message associated with the at least one paging indication. If the UE group number in the paging indication matches the UE group number of the UE 402, the UE 402 may receive and decode the paging message associated with the paging indication. On the other hand, if the UE group number in the paging indication does not match the UE group number of the UE 402, the UE 402 may choose not to receive or decode the paging message associated with the paging indication, e.g., in order to save power.

At 424, the UE 402 may select whether to keep the first UE group number when the UE moves to a new cell. It may be advantageous for the UE to request a new UE group number after moving to the new cell when the network supported paging attributes of the new cell are different from those of the previous cell.

Figure 5:
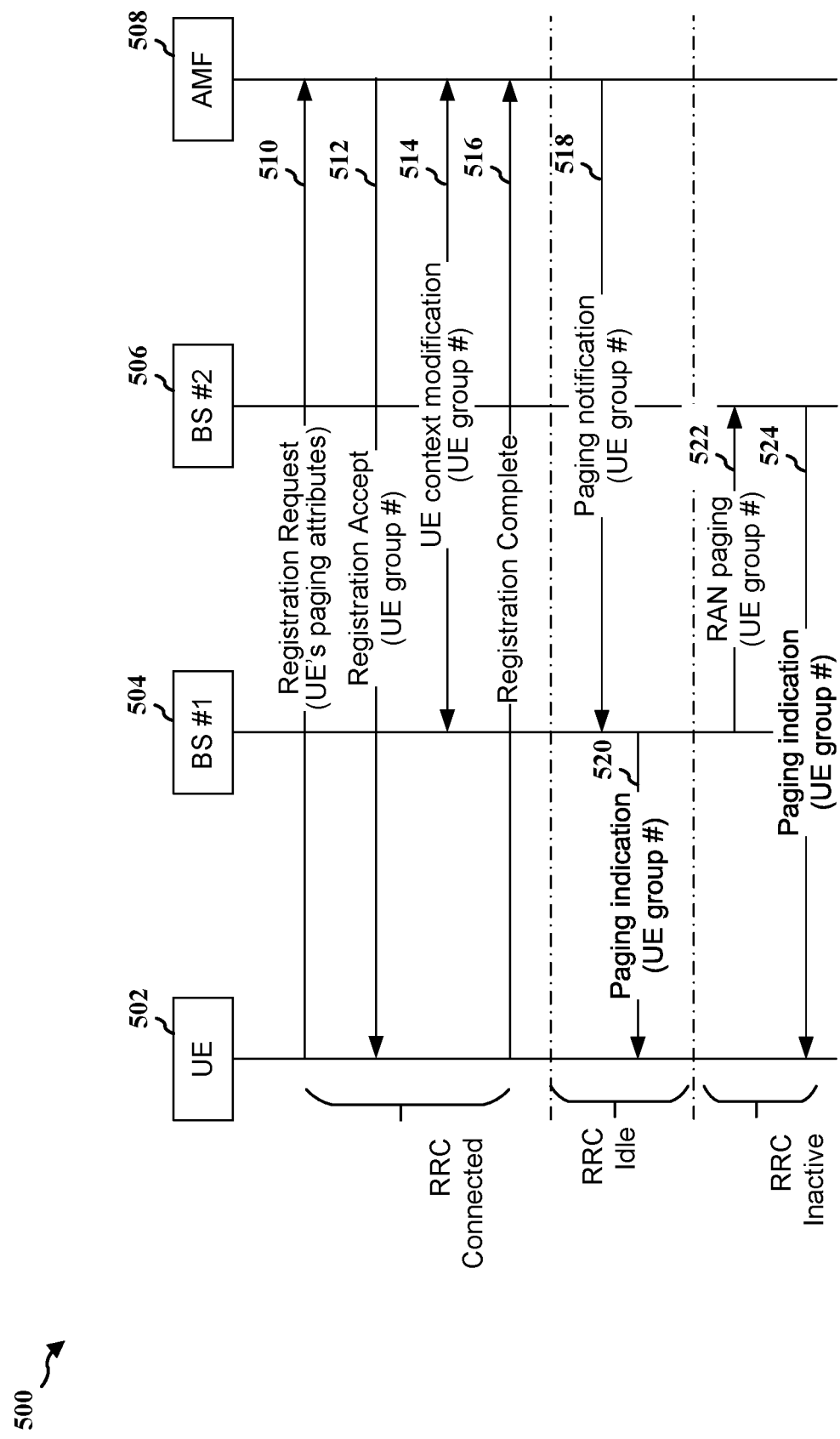
FIG. 5 is a communication flow of a wireless communication system.

FIG. 5 is a communication flow 500 of a wireless communication system. FIG. 5 illustrates scenarios where the core network (in particular, the AMF) controls the UE grouping. The UE 502 may correspond to the UE 104/350/402. The base stations 504/506 may correspond to the base station 102/180/310/404. The AMF 508 may correspond to the AMF 192. When the UE 502 is in the RRC Connected state, at 510, the UE 502 may provide the UE paging attributes of the UE 502 to the AMF 508 (e.g., in a Registration Request message). When the AMF 508 responds (e.g., with a Registration Accept message) at 512, the AMF 508 may include in the responses the UE's assigned UE group number.

At 514, the AMF 508 may additionally provide the UE 502's UE group number to the serving cell of the UE 502, the first base station 504 (e.g., via a UE Context Modification message or an Initial Context Setup message). At 516, the UE 502 may transmit a Registration Complete message to the AMF 508. In one configuration, the RRC state of the UE 502 may be used as a UE paging attribute in the identification of the UE group of the UE 502, and the AMF 508 may assign separate UE group numbers for the RRC Idle state or the RRC Inactive state.

When the UE 502 is in the RRC Idle state, and has a page from the core network, at 518, the AMF 508 may send a paging notification message including the UE group number of the UE 502 to the serving base station, the first base station 504. When the first base station 504 pages the UE 502 at 520, the first base station 504 may include the UE group number of the UE 502 in the paging indication (or PEI). Thus, when the UE 502 detects the UE group number match in the paging indication (or PEI), the UE 502 may proceed to receive and decode the paging message associated with the paging indication (or PEI).

When the UE 502 is in the RRC Inactive state, and has a page from the RAN, for example, when the UE 502 has new data but is in the RRC Inactive state, the anchor base station (e.g., the base station that last saw the UE), the first base station 504 may, at 522, send a RAN paging message including the UE group number of the UE 502 to other base stations (e.g., including the second base station 506). When the paging base station (e.g., as illustrated, the second base station 506) pages the UE 502 at 524, the paging base station (e.g., the second base station 506) may include the UE group number of the UE 502 in the paging indication (or PEI). Thus, when the UE 502 detects the UE group number match in the paging indication (or PEI), the UE 502 may proceed to receive and decode the paging message associated with the paging indication (or PEI).

Figure 6:
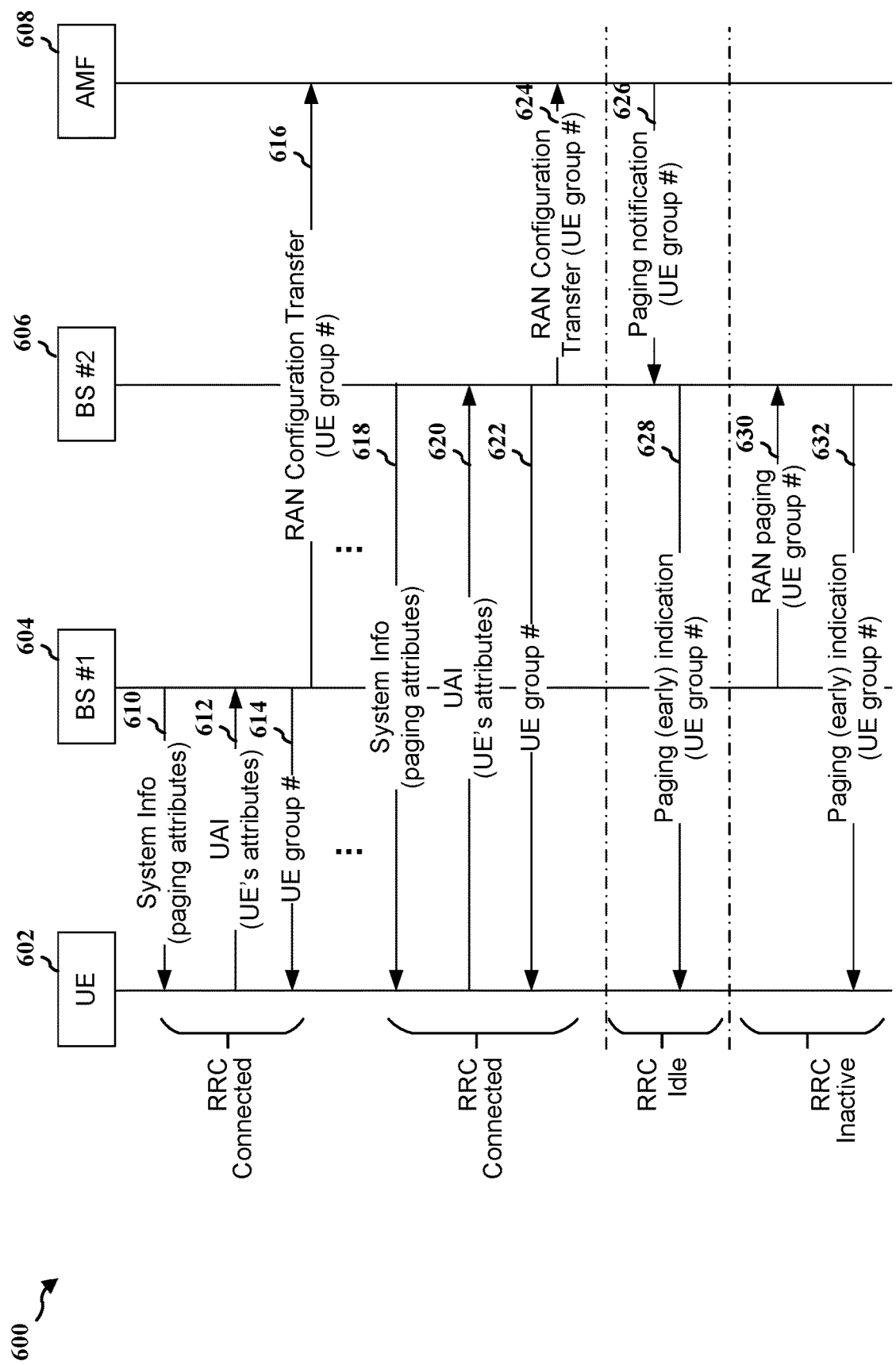
FIG. 6 is a communication flow of a wireless communication system.

FIG. 6 is a communication flow 600 of a wireless communication system. FIG. 6 illustrates scenarios where the RAN (in particular, the base station) controls the UE grouping. The UE 602 may correspond to the UE 104/350/402. The base stations 604/606 may correspond to the base station 102/180/310/404. The AMF 608 may correspond to the AMF 192. In one configuration, the maximum number of UE groups may be predefined or configured by the operator for all base stations in the same registration or tracking area.

When the UE 602 is in the RRC Connected state, at 610, the serving base station, the first base station 604 may advertise the set of network supported UE paging attributes. The network supported UE paging attributes may vary across different cells. The first base station 604 may assign, at 614, the UE group number to the UE 602 when the first base station 604 receives, at 612, the UE paging attributes from the UE 602 in a UAI message. The UE group number assigned to the UE 602 may be local to the serving cell of the first base station 604 (for example, based on the mixture of the UEs being served by the first base station 604). In addition, at 616, the first base station 604 may send the UE group number of the UE 602 to the AMF 608 (e.g., via a RAN Configuration Transfer message).

When the UE 602 moves to a different cell (e.g., the cell of the second base station 606), the UE 602 may decide either to keep the same UE group number or to request a new UE group number. It may be advantageous to request a new UE group number when the new cell has a different set of network supported paging attributes. At 618, the new serving base station, the second base station 606, may advertise the set of network supported UE paging attributes. In case the UE 602 decides to request a new UE group number after moving to the serving cell of the second base station 606, the second base station 606 may assign, at 622, the new UE group number to the UE 602 when the second base station 606 receives, at 620, the UE paging attributes from the UE 602 in a UAI message. In addition, at 624, the second base station 606 may send the new UE group number of the UE 602 to the AMF 608 (e.g., via a RAN Configuration Transfer message).

626, 628, 630, and 632 in FIG. 6 may be similar to 518, 520, 522, and 524 in FIG. 5. When the UE 602 is in the RRC Idle state, and has a page from the core network, at 626, the AMF 608 may send a paging notification message including the UE group number of the UE 602 to the serving base station, the first base station 604. When the first base station 604 pages the UE 602 at 628, the first base station 604 may include the UE group number of the UE 602 in the paging indication (or PEI). Thus, when the UE 602 detects the UE group number match in the paging indication (or PEI), the UE 602 may proceed to receive and decode the paging message associated with the paging indication (or PEI).

When the UE 602 is in the RRC Inactive state, and has a page from the RAN, for example, when the UE 602 has new data but is in the RRC Inactive state, the anchor base station, the first base station 604 may, at 630, send a RAN paging message including the UE group number of the UE 602 to other base stations (e.g., including the second base station 606). When the paging base station (e.g., as illustrated, the second base station 606) pages the UE 602 at 632, the paging base station (e.g., the second base station 606) may include the UE group number of the UE 602 in the paging indication (or PEI). Thus, when the UE 602 detects the UE group number match in the paging indication (or PEI), the UE 602 may proceed to receive and decode the paging message associated with the paging indication (or PEI).

Aspects described above may relate to grouping UEs within a same PO. In another aspect, the network may, based on the received UE paging attributes, inform the UE of the PO assigned to the UE as well as the assigned UE group within the PO. The assignment of a PO to the UE may be based on the reported UE paging attributes. Thus, the network may separate UEs with different attributes in different POs. In one configuration, it may be desirable to separate UEs not capable of supporting the PEI (i.e., wakeup signaling) from the UEs that are capable of supporting the PEI. This may help the network reduce the number of transmitted PEIs, hence reducing the PDCCH load. In another configuration, the network may separate UEs capable of cross-slot scheduling (K0>0) from those UEs that are incapable of cross-slot scheduling (k=0), so that UEs capable of cross-slot scheduling (K0>0) may further reduce their power consumption in paging reception. Accordingly, in one aspect, the network (the AMF and/or the base station) may include both the UE group number (or index) and the PO number (or index) in the response message transmitted after the PO and the UE group are assigned.

Figure 7:
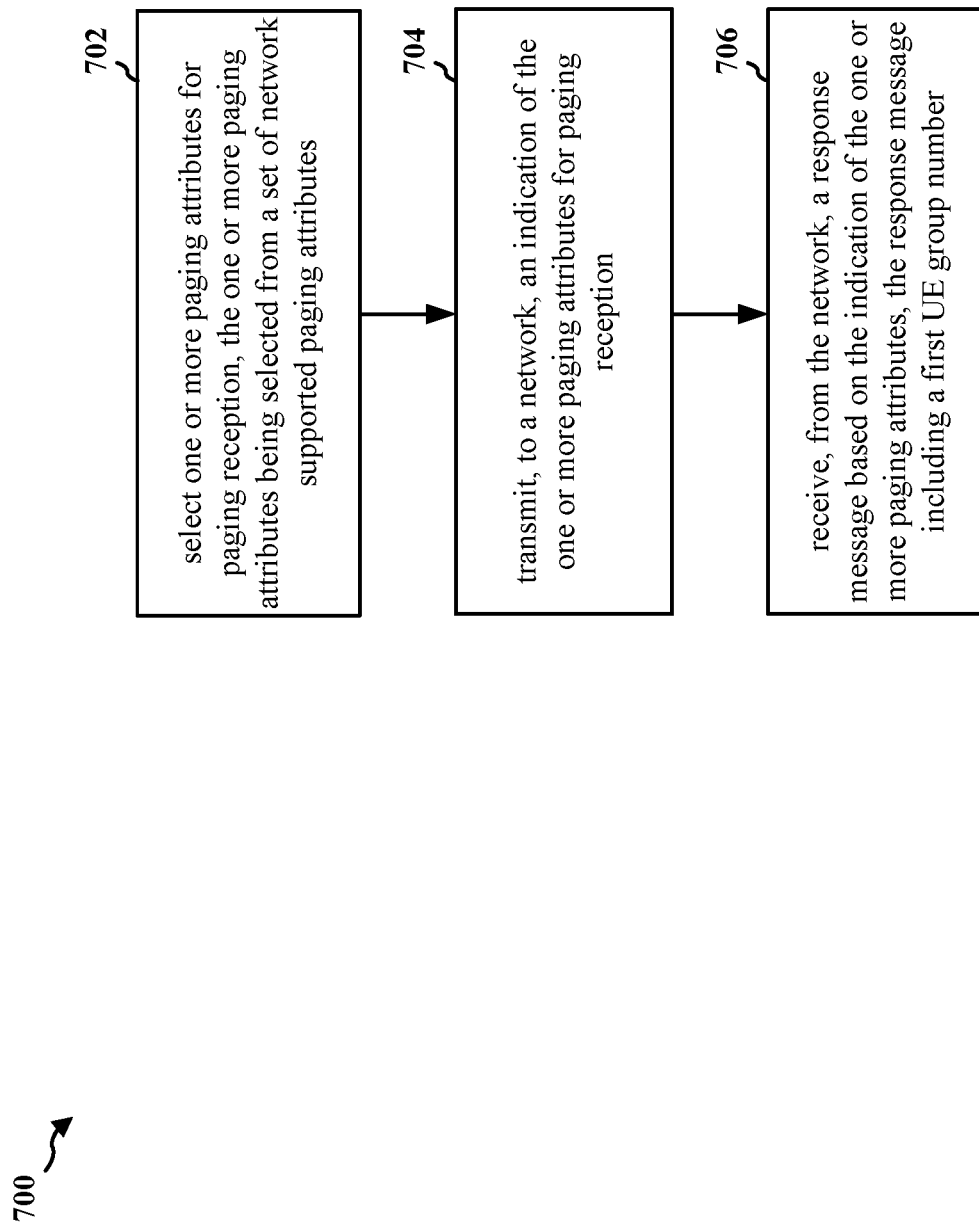
FIG. 7 is a flowchart of a method of wireless communication.

FIG. 7 is a flowchart 700 of a method of wireless communication. The method may be performed by a UE (e.g., the UE 104/350/402/502/602; the apparatus 1102). At 702, the UE may select one or more paging attributes for paging reception. The one or more paging attributes may be selected from a set of network supported paging attributes. For example, 702 may be performed by the paging component 1140 in FIG. 11. Referring to FIG. 4, at 408, the UE 402 may select one or more paging attributes for paging reception.

At 704, the UE may transmit, to a network, an indication of the one or more paging attributes for paging reception. For example, 704 may be performed by the paging component 1140 in FIG. 11. Referring to FIG. 4, at 410, the UE 402 may transmit, to a network 404, an indication of the one or more paging attributes for paging reception.

At 706, the UE may receive, from the network, a response message based on the indication of the one or more paging attributes. The response message may include a first UE group number. For example, 706 may be performed by the paging component 1140 in FIG. 11. Referring to FIG. 4, at 414, the UE 402 may receive, from the network 404, a response message based on the indication of the one or more paging attributes.

Figure 8:
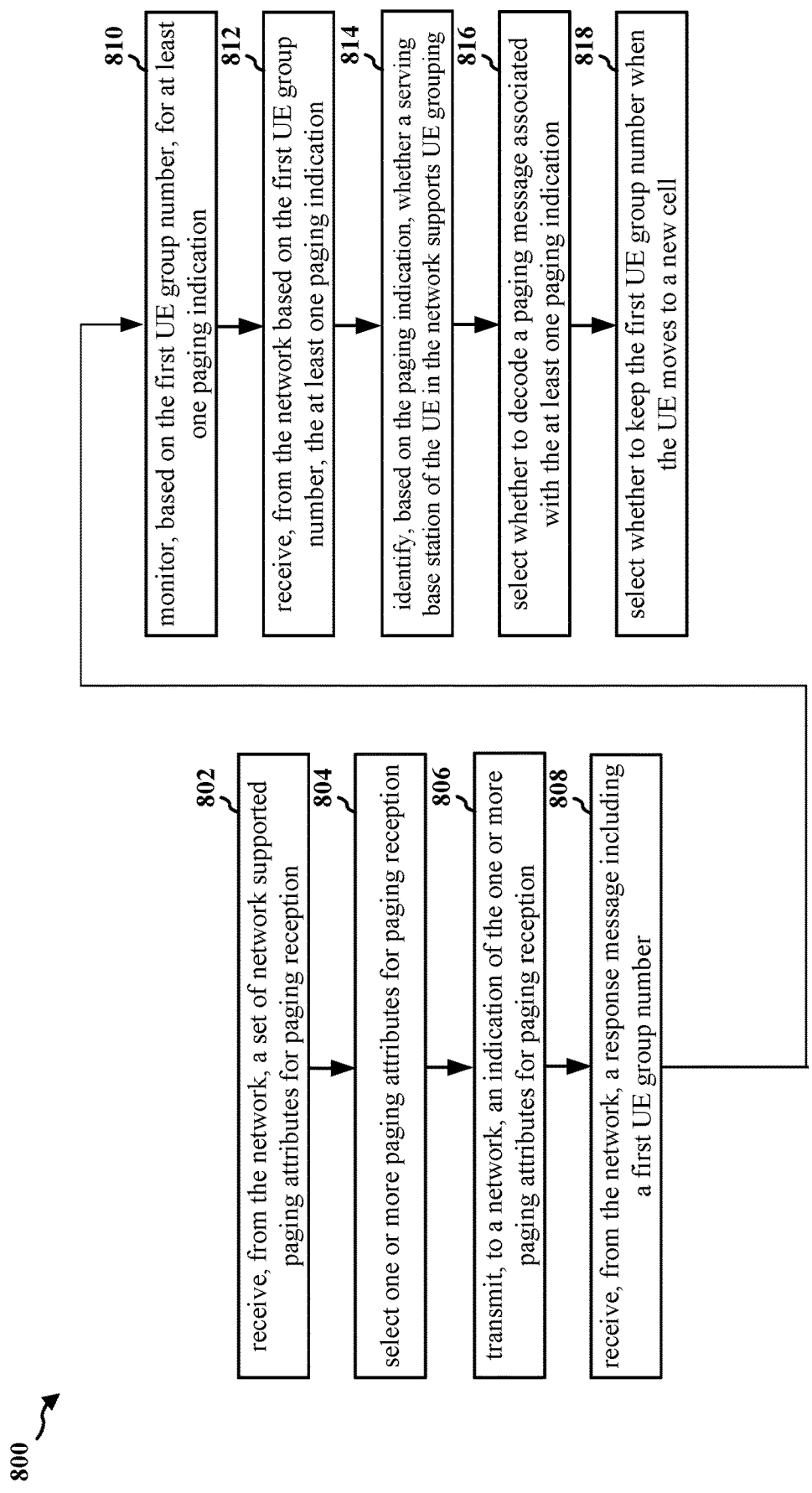
FIG. 8 is a flowchart of a method of wireless communication.

FIG. 8 is a flowchart 800 of a method of wireless communication. The method may be performed by a UE (e.g., the UE 104/350/402/502/602; the apparatus 1102). At 804, the UE may select one or more paging attributes for paging reception. The one or more paging attributes may be selected from a set of network supported paging attributes. For example, 804 may be performed by the paging component 1140 in FIG. 11. Referring to FIG. 4, at 408, the UE 402 may select one or more paging attributes for paging reception.

At 806, the UE may transmit, to a network, an indication of the one or more paging attributes for paging reception. For example, 806 may be performed by the paging component 1140 in FIG. 11. Referring to FIG. 4, at 410, the UE 402 may transmit, to a network 404, an indication of the one or more paging attributes for paging reception.

At 808, the UE may receive, from the network, a response message based on the indication of the one or more paging attributes. The response message may include a first UE group number. For example, 808 may be performed by the paging component 1140 in FIG. 11. Referring to FIG. 4, at 414, the UE 402 may receive, from the network 404, a response message based on the indication of the one or more paging attributes.

In one configuration, the one or more paging attributes may include at least one of: a UE paging probability, a UE power profile, a UE RRC state, or a UE mobility. In one configuration, the first UE group number may include an index for UEs targeted with a paging indication.

In one configuration, at 810, the UE may monitor, based on the first UE group number, for at least one paging indication. For example, 810 may be performed by the paging component 1140 in FIG. 11. Referring to FIG. 4, at 416, the UE 402 may monitor, based on the first UE group number, for at least one paging indication.

In one configuration, at 808, the UE may receive, from the network based on the first UE group number, the at least one paging indication. For example, 808 may be performed by the paging component 1140 in FIG. 11. Referring to FIG. 4, at 418, the UE 402 may receive, from the network 404 based on the first UE group number, the at least one paging indication.

In one configuration, the at least one paging indication may be received in a PO assigned to the UE. In one configuration, the at least one paging indication may be received in a slot prior to a PO assigned to the UE.

In one configuration, at 810, the UE may identify, based on the at least one paging indication, whether a serving base station of the UE in the network supports UE grouping. For example, 810 may be performed by the paging component 1140 in FIG. 11. Referring to FIG. 4, at 420, the UE 402 may identify, based on the at least one paging indication, whether a serving base station of the UE 402 in the network 404 supports UE grouping.

In one configuration, at 808, the UE may select, based on the first UE group number and the at least one paging indication, whether to decode a paging message associated with the at least one paging indication. For example, 808 may be performed by the paging component 1140 in FIG. 11. Referring to FIG. 4, at 422, the UE 402 may select, based on the first UE group number and the at least one paging indication, whether to decode a paging message associated with the at least one paging indication.

In one configuration, the indication of the one or more paging attributes may be transmitted to an AMF of the network via NAS signaling. In one configuration, the indication of the one or more paging attributes may be transmitted to a RAN of the network.

In one configuration, the indication of the one or more paging attributes may be transmitted to the network when the UE is in an RRC Connected state. In one configuration, the UE may initiate an RRC connection to transmit the indication of the one or more paging attributes. In one configuration, the UE may not transmit a subsequent indication of the one or more paging attributes before an expiration of a timer set at a previous transmission of the indication of the one or more paging attributes.

In one configuration, the one or more paging attributes may include a UE RRC state. The first UE group number may be for an RRC Idle state. The response message received from the network further may include a second UE group number for an RRC Inactive state.

In one configuration, at 810, the UE may select whether to keep the first UE group number when the UE moves to a new cell. For example, 810 may be performed by the paging component 1140 in FIG. 11. Referring to FIG. 4, at 424, the UE 402 may select whether to keep the first UE group number when the UE moves to a new cell.

In one configuration, at 802, the UE may receive, from the network, a set of network supported paging attributes for paging reception prior to selecting the one or more paging attributes for paging reception. The one or more paging attributes for paging reception may be selected based on the set of network supported paging attributes for paging reception. For example, 802 may be performed by the paging component 1140 in FIG. 11. Referring to FIG. 4, at 406, the UE 402 may receive, from the network 404, a set of network supported paging attributes for paging reception prior to selecting at 408 the one or more paging attributes for paging reception.

In one configuration, assignment of a PO to the UE may be based on the one or more paging attributes.

Figure 9:
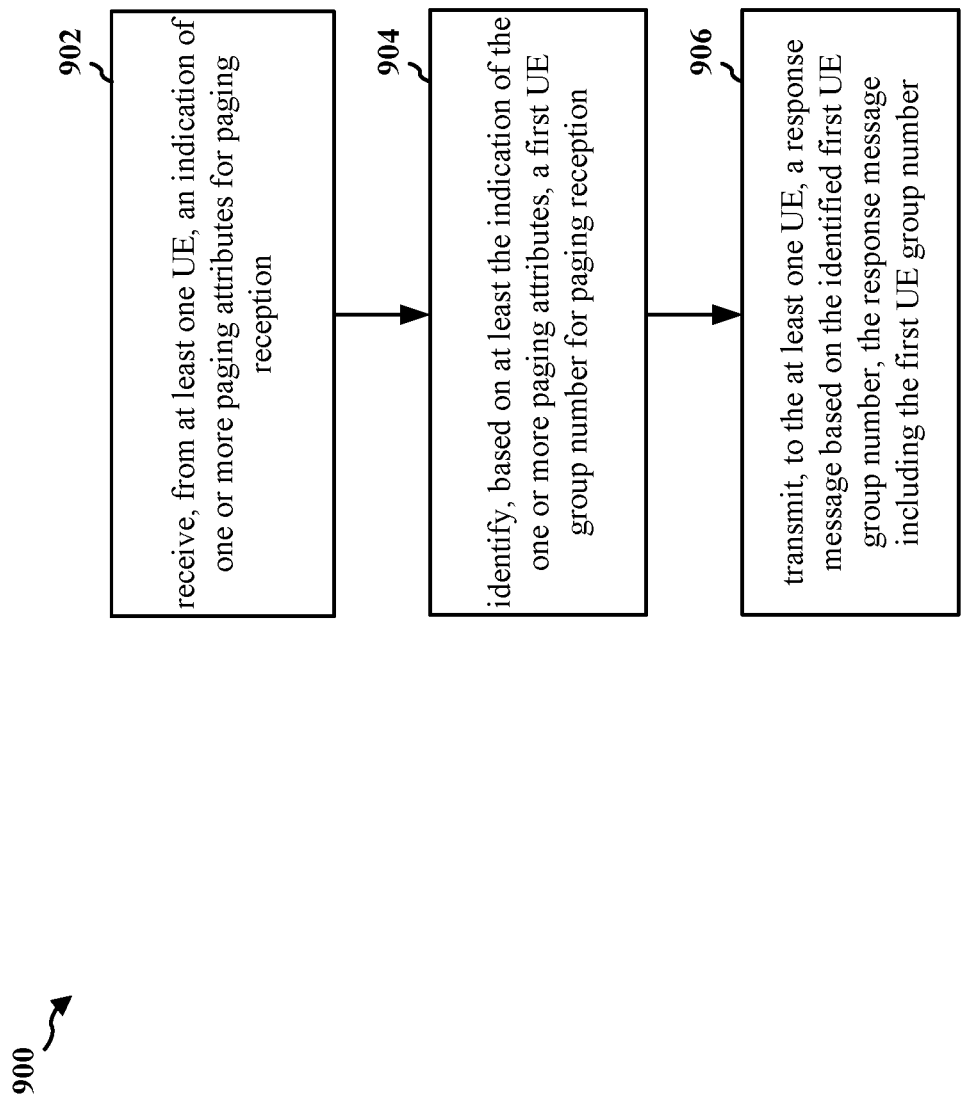
FIG. 9 is a flowchart of a method of wireless communication.

FIG. 9 is a flowchart 900 of a method of wireless communication. The method may be performed by a network (e.g., the base station 102/180/310/504/506/604/606; the AMF 192/508/608; the network 404; the apparatus 1202). At 902, the network may receive, from at least one UE, an indication of one or more paging attributes for paging reception. For example, 902 may be performed by the paging component 1240 in FIG. 12. Referring to FIG. 4, at 410, the network 404 may receive, from at least one UE 402, an indication of one or more paging attributes for paging reception.

At 904, the network may identify, based on at least the indication of the one or more paging attributes, a first UE group number for paging reception. For example, 904 may be performed by the paging component 1240 in FIG. 12. Referring to FIG. 4, at 412, the network 404 may identify, based on at least the indication of the one or more paging attributes, a first UE group number for paging reception.

At 906, the network may transmit, to the at least one UE, a response message based on the identified first UE group number. The response message may include the first UE group number. For example, 906 may be performed by the paging component 1240 in FIG. 12. Referring to FIG. 4, at 414, the network 404 may transmit, to the at least one UE 402, a response message based on the identified first UE group number.

Figure 10:
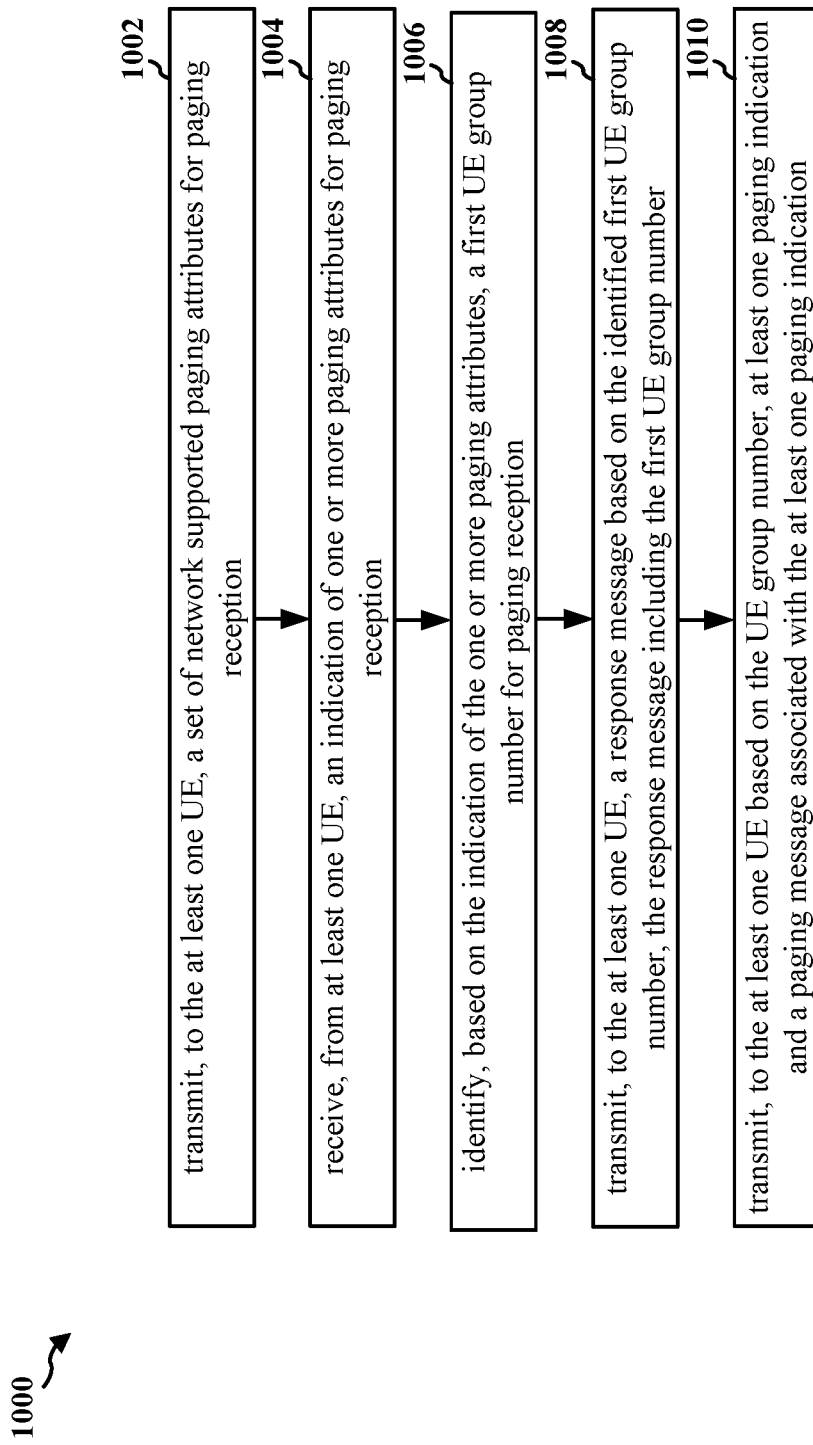
FIG. 10 is a flowchart of a method of wireless communication.

FIG. 10 is a flowchart 1000 of a method of wireless communication. The method may be performed by a network (e.g., the base station 102/180/310/504/506/604/606; the AMF 192/508/608; the network 404; the apparatus 1202). At 1004, the network may receive, from at least one UE, an indication of one or more paging attributes for paging reception. For example, 1004 may be performed by the paging component 1240 in FIG. 12. Referring to FIG. 4, at 410, the network 404 may receive, from at least one UE 402, an indication of one or more paging attributes for paging reception.

At 1006, the network may identify, based on at least the indication of the one or more paging attributes, a first UE group number for paging reception. For example, 1006 may be performed by the paging component 1240 in FIG. 12. Referring to FIG. 4, at 412, the network 404 may identify, based on at least the indication of the one or more paging attributes, a first UE group number for paging reception.

At 1008, the network may transmit, to the at least one UE, a response message based on the identified first UE group number. The response message may include the first UE group number. For example, 1008 may be performed by the paging component 1240 in FIG. 12. Referring to FIG. 4, at 414, the network 404 may transmit, to the at least one UE 402, a response message based on the identified first UE group number.

In one configuration, the one or more paging attributes may include at least one of: a UE paging probability, a UE power profile, a UE RRC state, or a UE mobility.

In one configuration, the first UE group number may include an index for UEs targeted with a paging indication.

In one configuration, the first UE group number may be identified based further on information from another network entity. In one configuration, the information may include at least one of: an expected UE behavior, an expected UE mobility, or an expected UE paging probability.

In one configuration, the indication of the one or more paging attributes may be received at an AMF of the network via NAS signaling. In one configuration, the first UE group number may be identified at the AMF. The AMF may transmit the first UE group number to a serving base station of the at least one UE in the network.

In one configuration, the indication of the one or more paging attributes may be received at a serving base station of the at least one UE in the network. In one configuration, the first UE group number may be identified at the serving base station. The serving base station may transmit the first UE group number to an AMF of the network.

In one configuration, at 1010, the network may transmit, to the at least one UE based on the first UE group number, at least one paging indication. The network may further send a paging message associated with the at least one paging indication. For example, 1010 may be performed by the paging component 1240 in FIG. 12. Referring to FIG. 4, at 418, the network 404 may transmit, to the at least one UE 402 based on the first UE group number, at least one paging indication.

In one configuration, the at least one paging indication may be transmitted in a PO assigned to the at least one UE. In one configuration, the at least one paging indication may be transmitted in a slot prior to a PO assigned to the at least one UE.

In one configuration, when the at least one UE is in an RRC Idle state, transmitting the at least one paging indication may include transmitting a paging notification from an AMF of the network to a serving base station of the UE in the network and transmitting the at least one paging indication from the serving base station of the UE in the network to the at least one UE.

In one configuration, when the at least one UE is in an RRC Inactive state, transmitting the at least one paging indication may include transmitting a RAN paging message from an anchor base station of the network to a paging base station of the network and transmitting the at least one paging indication from the paging base station of the network to the at least one UE.

In one configuration, the indication of the one or more paging attributes may be received from the at least one UE when the at least one UE is in an RRC Connected state.

In one configuration, the one or more paging attributes may include a UE RRC state. The first UE group number may be for an RRC Idle state. The response message transmitted to the at least one UE may further include a second UE group number for an RRC Inactive state.

In one configuration, at 1002, the network may transmit, to the at least one UE, a set of network supported paging attributes for paging reception prior to receiving, from the at least one UE, the indication of the one or more paging attributes for paging reception. The one or more paging attributes for paging reception may be based on the set of network supported paging attributes for paging reception. For example, 1002 may be performed by the paging component 1240 in FIG. 12. Referring to FIG. 4, at 406, the network 404 may transmit, to the at least one UE 402, a set of network supported paging attributes for paging reception prior to receiving at 410, from the at least one UE 402, the indication of the one or more paging attributes for paging reception.

In one configuration, assignment of a PO to the at least one UE may be identified based on the one or more paging attributes.

Figure 11:
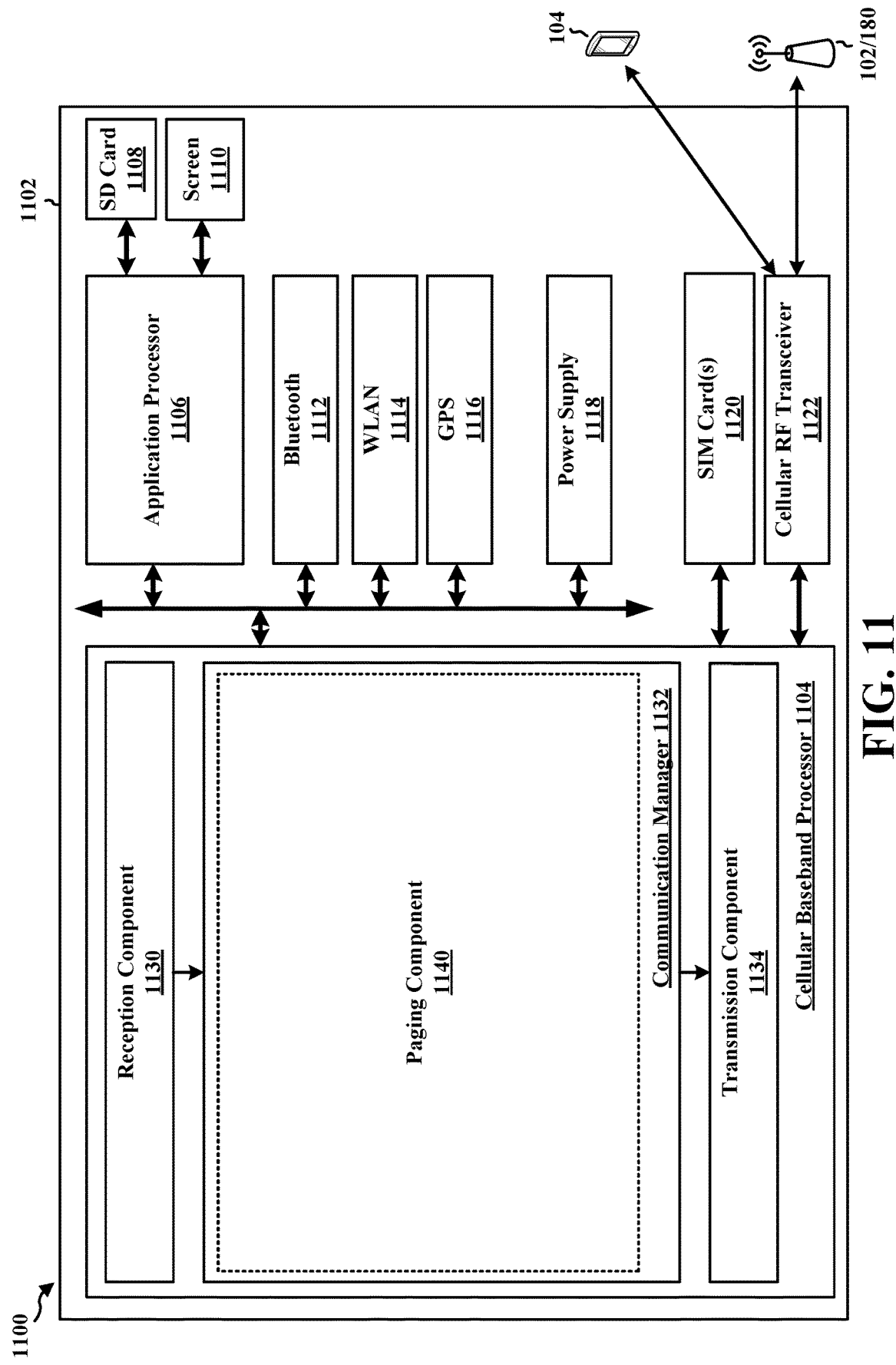
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a paging component 1140 that may be configured to receive, from the network, a set of network supported paging attributes for paging reception prior to selecting the one or more paging attributes for paging reception, e.g., as described in connection with 802 in FIG. 8. The paging component 1140 may be further configured to select one or more paging attributes for paging reception, the one or more paging attributes being selected from a set of network supported paging attributes, e.g., as described in connection with 702 in FIGS. 7 and 804 in FIG. 8. The paging component 1140 may be further configured to transmit, to a network, an indication of the one or more paging attributes for paging reception, e.g., as described in connection with 704 in FIGS. 7 and 806 in FIG. 8. The paging component 1140 may be further configured to receive, from the network, a response message based on the indication of the one or more paging attributes, e.g., as described in connection with 706 in FIGS. 7 and 808 in FIG. 8. The paging component 1140 may be further configured to monitor, based on the first UE group number, for at least one paging indication, e.g., as described in connection with 810 in FIG. 8. The paging component 1140 may be further configured to receive, from the network based on the first UE group number, the at least one paging indication, e.g., as described in connection with 812 in FIG. 8. The paging component 1140 may be further configured to identify, based on the at least one paging indication, whether a serving base station of the UE in the network supports UE grouping, e.g., as described in connection with 814 in FIG. 8. The paging component 1140 may be further configured to select, based on the first UE group number and the at least one paging indication, whether to decode a paging message associated with the at least one paging indication, e.g., as described in connection with 816 in FIG. 8. The paging component 1140 may be further configured to select whether to keep the first UE group number when the UE moves to a new cell, e.g., as described in connection with 818 in FIG. 8.

The apparatus may include additional components that perform each of the blocks of the algorithm in the flowcharts of FIGS. 4-8. As such, each block in the flowcharts of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for selecting one or more paging attributes for paging reception, the one or more paging attributes being selected from a set of network supported paging attributes. The apparatus 1102 may further include means for transmitting, to a network, an indication of the one or more paging attributes for paging reception. The apparatus 1102 may further include means for receiving, from the network, a response message based on the indication of the one or more paging attributes, the response message including a first UE group number.

In one configuration, the one or more paging attributes may include at least one of: a UE paging probability, a UE power profile, a UE RRC state, or a UE mobility. In one configuration, the first UE group number may include an index for UEs targeted with a paging indication. In one configuration, the apparatus 1102 may further include means for monitoring, based on the first UE group number, for at least one paging indication. In one configuration, the apparatus 1102 may further include means for receiving, from the network based on the first UE group number, the at least one paging indication. In one configuration, the at least one paging indication may be received in a PO assigned to the UE. In one configuration, the at least one paging indication may be received in a slot prior to a PO assigned to the UE. In one configuration, the apparatus 1102 may further include means for identifying, based on the at least one paging indication, whether a serving base station of the UE in the network supports UE grouping. In one configuration, the apparatus 1102 may further include means for selecting, based on the first UE group number and the at least one paging indication, whether to decode a paging message associated with the at least one paging indication. In one configuration, the indication of the one or more paging attributes may be transmitted to an AMF of the network via NAS signaling. In one configuration, the indication of the one or more paging attributes may be transmitted to a RAN of the network. In one configuration, the indication of the one or more paging attributes may be transmitted to the network when the UE is in an RRC Connected state. In one configuration, the apparatus 1102 may further include means for initiating an RRC connection to transmit the indication of the one or more paging attributes. In one configuration, the UE may not transmit a subsequent indication of the one or more paging attributes before an expiration of a timer set at a previous transmission of the indication of the one or more paging attributes. In one configuration, the one or more paging attributes may include a UE RRC state. The first UE group number may be for an RRC Idle state. The response message received from the network further may include a second UE group number for an RRC Inactive state. In one configuration, the apparatus 1102 may further include means for selecting whether to keep the first UE group number when the UE moves to a new cell. In one configuration, the apparatus 1102 may further include means for receiving, from the network, a set of network supported paging attributes for paging reception prior to selecting the one or more paging attributes for paging reception, where the one or more paging attributes for paging reception may be selected based on the set of network supported paging attributes for paging reception. In one configuration, assignment of a PO to the UE may be based on the one or more paging attributes.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a paging component 1240 that may be configured to transmit, to the at least one UE, a set of network supported paging attributes for paging reception, e.g., as described in connection with 1002 in FIG. 10. The paging component 1240 may be further configured to receive, from at least one UE, an indication of one or more paging attributes for paging reception, e.g., as described in connection with 902 in FIGS. 9 and 1004 in FIG. 10. The paging component 1240 may be further configured to identify, based on at least the indication of the one or more paging attributes, a first UE group number for paging reception, e.g., as described in connection with 904 in FIGS. 9 and 1006 in FIG. 10. The paging component 1240 may be further configured to transmit, to the at least one UE, a response message based on the identified first UE group number, e.g., as described in connection with 906 in FIGS. 9 and 1008 in FIG. 10. The paging component 1240 may be further configured to transmit, based on the first UE group number, at least one paging indication and a paging message associated with the at least one paging indication, e.g., as described in connection with 1010 in FIG. 10.

The apparatus may include additional components that perform each of the blocks of the algorithm in the flowcharts of FIGS. 4-6, 9, and 10. As such, each block in the flowcharts of FIGS. 4-6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from at least one UE, an indication of one or more paging attributes for paging reception. The apparatus 1202 may further include means for identifying, based on at least the indication of the one or more paging attributes, a first UE group number for paging reception. The apparatus 1202 may further include means for transmitting, to the at least one UE, a response message based on the identified first UE group number, the response message including the first UE group number.

In one configuration, the one or more paging attributes may include at least one of: a UE paging probability, a UE power profile, a UE RRC state, or a UE mobility. In one configuration, the first UE group number may include an index for UEs targeted with a paging indication. In one configuration, the first UE group number may be identified based further on information from another network entity. In one configuration, the information may include at least one of: an expected UE behavior, an expected UE mobility, or an expected UE paging probability. In one configuration, the indication of the one or more paging attributes may be received at an AMF of the network via NAS signaling. In one configuration, the first UE group number may be identified at the AMF. The AMF may transmit the first UE group number to a serving base station of the at least one UE in the network. In one configuration, the indication of the one or more paging attributes may be received at a serving base station of the at least one UE in the network. In one configuration, the first UE group number may be identified at the serving base station. The serving base station may transmit the first UE group number to an AMF of the network. In one configuration, the apparatus 1202 may further include means for transmitting, based on the first UE group number, at least one paging indication and a paging message associated with the at least one paging indication. In one configuration, the at least one paging indication may be transmitted in a PO assigned to the at least one UE. In one configuration, the at least one paging indication may be transmitted in a slot prior to a PO assigned to the at least one UE. In one configuration, when the at least one UE is in an RRC Idle state, transmitting the at least one paging indication may include transmitting a paging notification from an AMF of the network to a serving base station of the UE in the network and transmitting the at least one paging indication from the serving base station of the UE in the network to the at least one UE. In one configuration, when the at least one UE is in an RRC Inactive state, transmitting the at least one paging indication may include transmitting a RAN paging message from an anchor base station of the network to a paging base station of the network and transmitting the at least one paging indication from the paging base station of the network to the at least one UE. In one configuration, the indication of the one or more paging attributes may be received from the at least one UE when the at least one UE is in an RRC Connected state. In one configuration, the one or more paging attributes may include a UE RRC state. The first UE group number may be for an RRC Idle state. The response message transmitted to the at least one UE may further include a second UE group number for an RRC Inactive state. In one configuration, the apparatus 1202 may further include means for transmitting, to the at least one UE, a set of network supported paging attributes for paging reception prior to receiving, from the at least one UE, the indication of the one or more paging attributes for paging reception, where the one or more paging attributes for paging reception may be based on the set of network supported paging attributes for paging reception. In one configuration, assignment of a PO to the at least one UE may be identified based on the one or more paging attributes.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described above, the UE may select one or more paging attributes for paging reception. The one or more paging attributes may be selected from a set of network supported paging attributes. The UE may transmit, to a network, an indication of the one or more paging attributes for paging reception. The UE may receive, from the network, a response message based on the indication of the one or more paging attributes. The response message may include a first UE group number. The first UE group number may be based on at least the one or more paging attributes. Thus, the UE may receive a paging indication including a UE group number. The UE may proceed to receive and decode the paging message associated with the paging indication when the UE group number in the paging indication matches the first UE group number. Otherwise, the UE may safely disregard the paging message, and power may be saved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to select one or more paging attributes for paging reception, the one or more paging attributes being selected from a set of network supported paging attributes; transmit, to a network, an indication of the one or more paging attributes for paging reception; and receive, from the network, a response message based on the indication of the one or more paging attributes, the response message including a first UE group number.

Aspect 2 is the apparatus of aspect 1, where the one or more paging attributes include at least one of: a UE paging probability, a UE power profile, a UE RRC state, or a UE mobility.

Aspect 3 is the apparatus of any of aspects 1 and 2, where the first UE group number includes an index for UEs targeted with a paging indication.

Aspect 4 is the apparatus of any of aspects 1 to 3, the at least one processor being further configured to: monitor, based on the first UE group number, for at least one paging indication.

Aspect 5 is the apparatus of aspect 4, the at least one processor being further configured to: receive, from the network based on the first UE group number, the at least one paging indication.

Aspect 6 is the apparatus of aspect 4, where the at least one paging indication is received in a PO assigned to the UE.

Aspect 7 is the apparatus of aspect 4, where the at least one paging indication is received in a slot prior to a PO assigned to the UE.

Aspect 8 is the apparatus of aspect 5, the at least one processor being further configured to: identify, based on the at least one paging indication, whether a serving base station of the UE in the network supports UE grouping.

Aspect 9 is the apparatus of aspect 5, the at least one processor being further configured to: select, based on the first UE group number and the at least one paging indication, whether to decode a paging message associated with the at least one paging indication.

Aspect 10 is the apparatus of any of aspects 1 to 9, where the indication of the one or more paging attributes is transmitted to an AMF of the network via NAS signaling.

Aspect 11 is the apparatus of any of aspects 1 to 9, where the indication of the one or more paging attributes is transmitted to a RAN of the network.

Aspect 12 is the apparatus of any of aspects 1 to 11, where the indication of the one or more paging attributes is transmitted to the network when the UE is in an RRC Connected state.

Aspect 13 is the apparatus of any of aspects 1 to 12, the at least one processor being further configured to: initiate an RRC connection to transmit the indication of the one or more paging attributes.

Aspect 14 is the apparatus of any of aspects 1 to 13, where the UE does not transmit a subsequent indication of the one or more paging attributes before an expiration of a timer set at a previous transmission of the indication of the one or more paging attributes.

Aspect 15 is the apparatus of any of aspects 1 to 14, where the one or more paging attributes include a UE RRC state, the first UE group number is for an RRC Idle state, and the response message received from the network further includes a second UE group number for an RRC Inactive state.

Aspect 16 is the apparatus of any of aspects 1 to 15, the at least one processor being further configured to: select whether to keep the first UE group number when the UE moves to a new cell.

Aspect 17 is the apparatus of any of aspects 1 to 16, the at least one processor being further configured to: receive, from the network, the set of network supported paging attributes for paging reception prior to selecting the one or more paging attributes for paging reception, where the one or more paging attributes for paging reception are selected based on the set of network supported paging attributes for paging reception.

Aspect 18 is the apparatus of any of aspects 1 to 17, where assignment of a PO to the UE is based on the one or more paging attributes.

Aspect 19 is the apparatus of any of aspects 1 to 18, further comprising a transceiver coupled to the at least one processor.

Aspect 20 is an apparatus for wireless communication at a network including at least one processor coupled to a memory and configured to receive, from at least one UE, an indication of one or more paging attributes for paging reception; identify, based on at least the indication of the one or more paging attributes, a first UE group number for paging reception; and transmit, to the at least one UE, a response message based on the identified first UE group number, the response message including the first UE group number.

Aspect 21 is the apparatus of aspect 20, where the one or more paging attributes include at least one of: a UE paging probability, a UE power profile, a UE RRC state, or a UE mobility.

Aspect 22 is the apparatus of any of aspect 20 and 21, where the first UE group number includes an index for UEs targeted with a paging indication.

Aspect 23 is the apparatus of any of aspects 20 to 22, where the first UE group number is identified based further on information from another network entity.

Aspect 24 is the apparatus of aspect 23, where the information includes at least one of: an expected UE behavior, an expected UE mobility, or an expected UE paging probability.

Aspect 25 is the apparatus of any of aspects 20 to 24, where the indication of the one or more paging attributes is received at an AMF of the network via NAS signaling.

Aspect 26 is the apparatus of aspect 25, where the first UE group number is identified at the AMF, the AMF transmits the first UE group number to a serving base station of the at least one UE in the network.

Aspect 27 is the apparatus of any of aspects 20 to 24, where the indication of the one or more paging attributes is received at a serving base station of the at least one UE in the network.

Aspect 28 is the apparatus of aspect 27, where the first UE group number is identified at the serving base station, the serving base station transmits the first UE group number to an AMF of the network.

Aspect 29 is the apparatus of any of aspects 20 to 28, the at least one processor being further configured to: transmit, based on the first UE group number, at least one paging indication and a paging message associated with the at least one paging indication.

Aspect 30 is the apparatus of aspect 29, where the at least one paging indication is transmitted in a PO assigned to the at least one UE.

Aspect 31 is the apparatus of aspect 29, where the at least one paging indication is transmitted in a slot prior to a PO assigned to the at least one UE.

Aspect 32 is the apparatus of aspect 29, where when the at least one UE is in an RRC Idle state, the at least one processor configured to transmit the at least one paging indication is further configured to transmit a paging notification from an AMF of the network to a serving base station of the UE in the network and transmit the at least one paging indication from the serving base station of the UE in the network to the at least one UE.

Aspect 33 is the apparatus of aspect 29, where when the at least one UE is in an RRC Inactive state, the at least one processor configured to transmit the at least one paging indication is further configured to transmit a RAN paging message from an anchor base station of the network to a paging base station of the network and transmit the at least one paging indication from the paging base station of the network to the at least one UE.

Aspect 34 is the apparatus of any of aspects 20 to 33, where the indication of the one or more paging attributes is received from the at least one UE when the at least one UE is in an RRC Connected state.

Aspect 35 is the apparatus of any of aspects 20 to 34, where the one or more paging attributes include a UE RRC state, the first UE group number is for an RRC Idle state, and the response message transmitted to the at least one UE further includes a second UE group number for an RRC Inactive state.

Aspect 36 is the apparatus of any of aspects 20 to 35, the at least one processor being further configured to: transmit, to the at least one UE, a set of network supported paging attributes for paging reception prior to receiving, from the at least one UE, the indication of the one or more paging attributes for paging reception, where the one or more paging attributes for paging reception are based on the set of network supported paging attributes for paging reception.

Aspect 37 is the apparatus of any of aspects 20 to 36, where assignment of a PO to the at least one UE is identified based on the one or more paging attributes.

Aspect 38 is the apparatus of any of aspects 20 to 37, further comprising a transceiver coupled to the at least one processor.

Aspect 39 is a method of wireless communication for implementing any of aspects 1 to 38.

Aspect 40 is an apparatus for wireless communication including means for implementing any of aspects 1 to 38.

Aspect 41 is a computer-readable medium storing computer executable code, where the code when executed by a processor causes the processor to implement any of aspects 1 to 38.

What is claimed is:

1. A user equipment (UE) for wireless communication, comprising:
   a memory; and
   at least one processor coupled to the memory, wherein the at least one processor is configured to:
   transmit, to a network, an indication of one or more paging attributes for paging reception; and
   receive, from the network, a response message, wherein the response message includes a UE group number, and wherein the UE group number is based on an expected mobility status of the UE and the indication of the one or more paging attributes.

2. The UE of claim 1, wherein the one or more paging attributes include at least one of: a paging probability of the UE, a power profile of the UE, a radio resource control (RRC) state of the UE, or a current mobility status of the UE.

3. The UE of claim 2, wherein the one or more paging attributes include the paging probability of the UE.

4. The UE of claim 2, wherein the one or more paging attributes include the current mobility status of the UE.

5. The UE of claim 1, wherein the at least one processor is configured to:
   monitor, based on the UE group number, for at least one paging indication.

6. The UE of claim 1, wherein the at least one processor is configured to:
   receive, from the network based on the UE group number, at least one paging indication.

7. The UE of claim 6, wherein the at least one processor is configured to:
   identify, based on the at least one paging indication, whether a base station of the network configured to serve the UE supports UE grouping.

8. The UE of claim 6, wherein the at least one processor is configured to:
   decode, based on the UE group number and the at least one paging indication, a paging message associated with the at least one paging indication.

9. The UE of claim 1, wherein, to transmit the indication of the one or more paging attributes to the network, the at least one processor is configured to transmit non-access stratum (NAS) signaling including the indication of the one or more paging attributes.

10. The UE of claim 9, wherein, to transmit the NAS signaling to the network, the at least one processor is configured to transmit the NAS signaling to an access and mobility management function (AMF) entity of the network.

11. The UE of claim 1, wherein, to transmit the indication of the one or more paging attributes to the network, the at least one processor is configured to transmit the indication of the one or more paging attributes to the network when the UE is in a radio resource control (RRC) connected state.

12. The UE of claim 1, wherein at least one processor is configured to:
   initiate a radio resource control (RRC) connection to transmit the indication of the one or more paging attributes.

13. The UE of claim 1, wherein the at least one processor is configured to select the one or more paging attributes for paging reception.

14. The UE of claim 1, wherein the one or more paging attributes include a current mobility status of the UE.

15. The UE of claim 1, wherein the one or more paging attributes include a power profile of the UE.

16. The UE of claim 1, wherein the one or more paging attributes include a radio resource control (RRC) state of the UE.

17. A method of wireless communication performed by a user equipment (UE), comprising:
   transmitting, to a network, an indication of one or more paging attributes for paging reception; and
   receiving, from the network, a response message, wherein the response message includes a UE group number, and wherein the UE group number is based on an expected mobility status of the UE and the indication of the one or more paging attributes.

18. The method of claim 17, wherein the one or more paging attributes include a paging probability of the UE.

19. The method of claim 17, further comprising selecting the one or more paging attributes for paging reception.

20. A first network entity for wireless communication, comprising:
a memory; and
at least one processor coupled to the memory, wherein the at least one processor is configured to:
receive, from a user equipment (UE), an indication of one or more paging attributes for paging reception; and
transmit, to the UE, a response message including a UE group number, wherein the UE group number is based on an expected mobility status of the UE and the indication of the one or more paging attributes.

21. The first network entity of claim 20, wherein the one or more paging attributes include at least one of: a paging probability of the UE, a power profile of the UE, a radio resource control (RRC) state of the UE, or a current mobility status of the UE.

22. The first network entity of claim 21, wherein the one or more paging attributes include the paging probability of the UE.

23. The first network entity of claim 21, wherein the one or more paging attributes include the current mobility status of the UE.

24. The first network entity of claim 20, wherein to identify the UE group number, the at least one processor is configured to receive information from a second network entity.

25. The first network entity of claim 24, wherein the information includes at least one of: an expected UE behavior or the expected mobility status of the UE.

26. The first network entity of claim 20, wherein, to receive the indication of the one or more paging attributes, the at least one processor is configured to receive non-access stratum (NAS) signaling including the indication of the one or more paging attributes.

27. The first network entity of claim 26, wherein the first network entity includes an access and mobility management function (AMF) entity.

28. The first network entity of claim 20, wherein the at least one processor is configured to:
transmit, based on the UE group number, at least one paging indication and a paging message associated with the at least one paging indication.

29. The first network entity of claim 20, wherein the at least one processor is configured to:
transmit, to the UE, a set of network supported paging attributes for paging reception prior to receipt of the indication of the one or more paging attributes for paging reception, wherein the one or more paging attributes for paging reception are based on the set of network supported paging attributes for paging reception.

30. The first network entity of claim 20, wherein the at least one processor is configured to:
identify, based on the indication of the one or more paging attributes, the UE group number for paging reception.

31. A method of wireless communication performed by a first network entity, comprising:
receiving, from a user equipment (UE), an indication of one or more paging attributes for paging reception; and
transmitting, to the UE, a response message including a UE group number, wherein the UE group number is based on an expected mobility status of the UE and the indication of the one or more paging attributes.

32. The method of claim 31, wherein the one or more paging attributes include a paging probability of the UE.

33. A user equipment (UE) for wireless communication, comprising:
a memory; and
at least one processor coupled to the memory, wherein the at least one processor is configured to:
transmit, to a network, an indication of one or more paging attributes for paging reception; and
receive, from the network, a response message including a UE group number, wherein the response message is based on an expected mobility status of the UE and the indication of the one or more paging attributes.

34. The UE of claim 33, wherein the one or more paging attributes include at least one of: a paging probability of the UE, a power profile of the UE, a radio resource control (RRC) state of the UE, or a current mobility status of the UE.

35. The UE of claim 34, wherein the one or more paging attributes include the paging probability of the UE.

36. The UE of claim 34, wherein the one or more paging attributes include the current mobility status of the UE.

37. The UE of claim 34, wherein the at least one processor is configured to select the one or more paging attributes for paging reception.

38. A first network entity for wireless communication, comprising:
a memory; and
at least one processor coupled to the memory, wherein the at least one processor is configured to:
receive, from a user equipment (UE), an indication of one or more paging attributes for paging reception; and
transmit, to the UE, a response message including a UE group number, wherein the response message is based on an expected mobility status of the UE and the indication of the one or more paging attributes.

39. The first network entity of claim 38, wherein the one or more paging attributes include at least one of: a paging probability of the UE, a power profile of the UE, a radio resource control (RRC) state of the UE, or a current mobility status of the UE.

40. The first network entity of claim 39, wherein the one or more paging attributes include the paging probability of the UE.

41. The first network entity of claim 39, wherein the one or more paging attributes include the current mobility status of the UE.

42. The first network entity of claim 39, wherein the at least one processor is configured to:
identify, based on the indication of the one or more paging attributes, the UE group number for paging reception.

* * * * *